US012650554B2

(12) United States Patent
Watekar et al.

(10) Patent No.: US 12,650,554 B2
(45) Date of Patent: Jun. 9, 2026

(54) OPTICAL FIBER WITH A LARGE EFFECTIVE AREA

(71) Applicant: Sterlite Technologies Limited, Gurugram (IN)

(72) Inventors: Pramod R. Watekar, Gurugram (IN); Malleswara Rao Lanke, Gurugram (IN); Arvind Mishra, Gurugram (IN)

( * ) Notice: Subject to any disclaimer, the term of this patent is extended or adjusted under 35 U.S.C. 154(b) by 430 days.

(21) Appl. No.: 18/340,868

(22) Filed: Jun. 25, 2023

(65) Prior Publication Data
US 2024/0280744 A1      Aug. 22, 2024

(30) Foreign Application Priority Data
Feb. 20, 2023      (IN) .............................. 202311011407

(51) Int. Cl.
*G02B 6/02* (2006.01)

(52) U.S. Cl.
CPC ..... *G02B 6/02009* (2013.01); *G02B 6/02214* (2013.01)

(58) Field of Classification Search
CPC .................................................. G02B 6/02009
See application file for complete search history.

(56) References Cited

U.S. PATENT DOCUMENTS

2012/0294576 A1* 11/2012 Li ...................... G02B 6/02019
                                                            385/124
2013/0251323 A1* 9/2013 Mukasa ............. G02B 6/02019
                                                            385/123
2019/0196104 A1* 6/2019 Ghiringhelli ...... G02B 6/03611

* cited by examiner

*Primary Examiner* — Chad H Smith
(74) *Attorney, Agent, or Firm* — Steven Fairchild

(57) ABSTRACT

The present invention relates to an optical fiber (200) having a core (202) extending along a central axis (206) and a cladding (204) concentrically surrounding the core (202). The core (202) has at least 83-mole percent (mol %) of Silicon dioxide (SiO2) and at most 17-mole percent (mol %) of an up-dopant and, the cladding (204) has at least 99-mole percent (mol %) of Silicon dioxide (SiO2). Further, the optical fiber (200) has (i) an effective area of greater than or equal to 100 $\mu m^2$, (ii) a mode field diameter (MFD) in a range of 11 $\mu m$ to 15 $\mu m$, and (iii) a chromatic dispersion of less than or equal to 23.5 picoseconds (ps/(Km·nm) at a wavelength of 1550 nm.

18 Claims, 9 Drawing Sheets

OPTICAL FIBER WITH A LARGE EFFECTIVE AREA

CROSS-REFERENCE TO RELATED APPLICATIONS

This application claims the benefit of Indian Application No. 202311011407 titled "OPTICAL FIBER WITH A LARGE EFFECTIVE AREA" filed by the applicant on Feb. 20, 2023, which is incorporated herein by reference in its entirety.

FIELD OF THE INVENTION

Embodiments of the present invention relate to the field of optical fiber communications, and more particularly to an optical fiber with a large effective area for an optical fiber communication system.

DESCRIPTION OF THE RELATED ART

The fields of data communications and telecommunications, optical fibers with small diameters are attracting attention as optical fibers that realize dense optical fiber cables. An optical fiber with a small diameter is in general an optical fiber in which a portion made of glass has a small diameter and the cladding diameter is small. Note that optical fibers with small diameters also include one whose outer circumference with a coating, formed such that the coating covers the outer circumference of a cladding, included is small because the cladding diameter is small.

An optical fiber communication system uses light as the carrier of information from a source to a destination via a guided fiber cable (glass or plastic). A communication system's information-carrying capacity is directly proportional to its bandwidth; that is, the wider the bandwidth, the greater the information-carrying capacity. Light frequencies used in fiber optical systems range from 104 to $4\times10^{14}$ Hz, resulting in higher information-carrying capacity.

An effective area is a quantitative measure of the area which a waveguide or fiber mode effectively covers in the transverse dimensions. The effect of nonlinearities can be reduced by designing a fiber with a large effective area. It is evident that nonzero-dispersion fibers have a small value of the chromatic dispersion in the 1.55 μm band to minimize the effects of chromatic dispersion. However, such fibers have smaller effective areas, and thus face enormous amount of nonlinearity and its associated challenges.

A prior art reference "US20150226914A1" disclosed an optical fiber with a core and cladding portions. The core is doped with an up dopant (chlorine), and it is surrounded by a first and second cladding. The second cladding has a higher refractive index than the first cladding. Using Chlorine as an up dopant in the core region of the optical fiber leads to low relative refractive index in the core region. The low refractive index results in a low effective area which increases nonlinear effects in the optical fiber. The nonlinear effects generate spurious (unwanted) signals and increase noise which is not desirable.

Another prior art "US20210214266A1" discloses an optical fiber with a core and cladding portions. An optical fiber preform is used to produce the optical fiber. The optical fiber preform is manufactured by combining silica and Germania precursors (Germanium dioxide). During the manufacturing of the optical fiber preform, the silica to germanium dioxide ratio varies from 1:1 to approximately 100:1, resulting in a gradual decrease in germanium dioxide concentration in the core portion. The core of the optical fiber is doped with Germanium, but the cladding is not pure silica. The prior art showcased step index fibers with a low effective area, resulting in an increase in nonlinearity which causes spurious signals and increases noise in data transmission. Such a condition is undesirable for optical signal transmission.

FIG. 1 A shows a confinement versus mode field in the core (with a constant refractive index 1.446) of a step-index fibers for a fundamental mode (LP01) at 1550 nm in accordance with a prior art. FIG. 1B Mode field intensities of the step-index fibers for a fundamental mode (LP01) at 1550 nm in accordance with a prior art.

However, there still remains a need to provide a technical solution that overcomes the aforementioned problems of the traditional optical fibers. Thus, the present invention provides an optical fiber with a large effective area.

SUMMARY OF THE INVENTION

Embodiments of the present invention relates to optical fiber comprising a core having at least 83 mole percent (mol %) of Silicon dioxide ($SiO_2$) and at least one up dopant; a cladding concentrically surrounding the core (102) with at least 99 mole percent (mol %) of Silicon dioxide ($SiO_2$). The optical fiber has (i) an effective area is greater than or equal to 100 micrometers square ($\mu m^2$), (ii) a mode field diameter (MFD) in a range of 11 micrometer (μm) to 15 μm, and (iii) a chromatic dispersion of less than or equal to 23.5 Picoseconds per nanometer wavelength change and kilometer propagation distance (ps/(Km·nm) at a wavelength of 1550 nm.

In accordance with an embodiment of the present invention, the at least one up dopant is Germanium (Ge).

In accordance with an embodiment of the present invention, the core and the cladding interfaces at a core-cladding interface (302) such that a concentration of the up dopant at the core-cladding interface (302) is less than 17 mol %.

In accordance with an embodiment of the present invention, the cladding is made up of pure silica with less than 1% metallic impurity.

In accordance with an embodiment of the present invention, the core has a core radius (R1) in a range of 4.45 μm to 15 μm In accordance with an embodiment of the present invention, the cladding has a cladding thickness (402) in a range of 47.5 μm to 58.05 μm.

In accordance with an embodiment of the present invention, the core has a maximum relative refractive index (Δ1 max) in a range of $2.05\times10^{-3}$ to $17.5\times10^{-3}$.

In accordance with an embodiment of the present invention, the cladding has a relative refractive index (Δ2) in a range of 0 to $1.3\times10^{-5}$.

In accordance with an embodiment of the present invention, the core-cladding interface (302) has a relative refractive index (Δint) in a range of 0 to $1.3\times10^{-5}$.

In accordance with an embodiment of the present invention, a chromatic dispersion value of the optical fiber is 20.87 ps/Km·nm at a wavelength of 1600 nano meter (nm) and the chromatic dispersion value is 14.39 ps/Km·nm at a wavelength of 1500 nm.

In accordance with an embodiment of the present invention, a cutoff wavelength of the optical fiber is less than or equal to 1530 nm.

In accordance with an embodiment of the present invention, a macro bend loss of the optical fiber is less than or equal to 10 dB/KM at a bend radius 30 mm and a wavelength of 1550 nm.

In accordance with an embodiment of the present invention, the core extends substantially parallel and along a central axis of the optical fiber, wherein the core has a refractive index (RI) profile defined by a centerline dip at the central axis such that a refractive index at the centerline dip is in a range of 1.44402 to 1.449.

BRIEF DESCRIPTION OF THE DRAWINGS

So that the manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference to the drawings, in which.

Figure 1A:
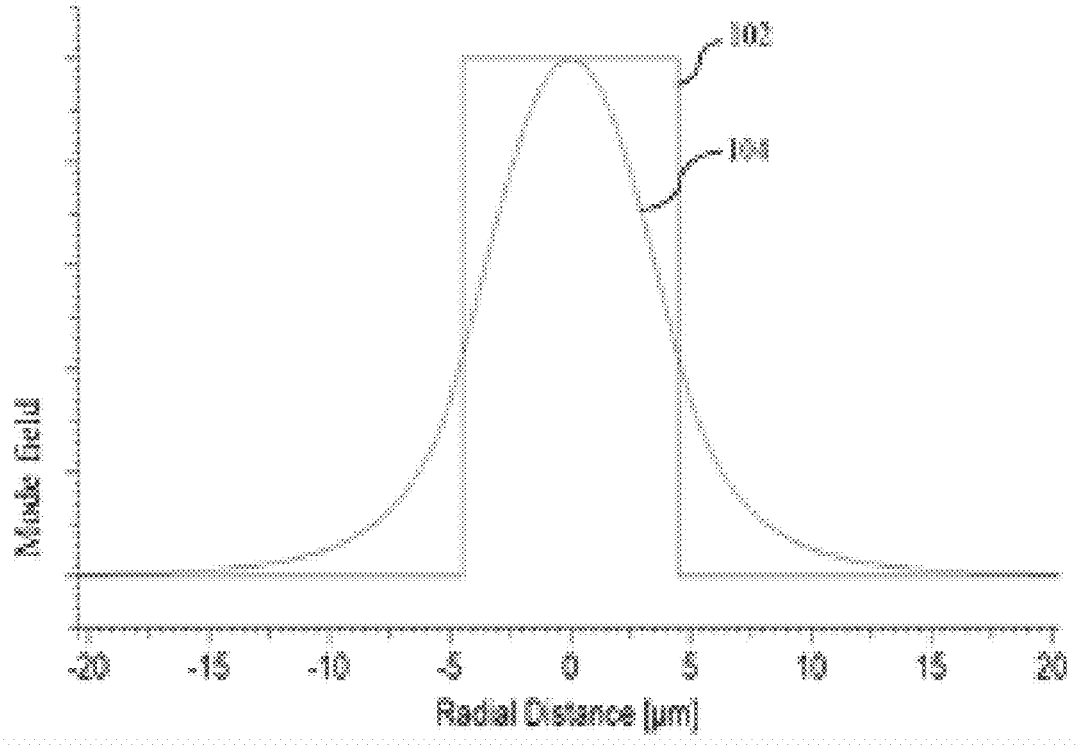
FIG. 1A is a pictorial snapshot illustrating a refractive index profile of an optical fiber of a prior art in accordance with an prior art.
Figure 1B:
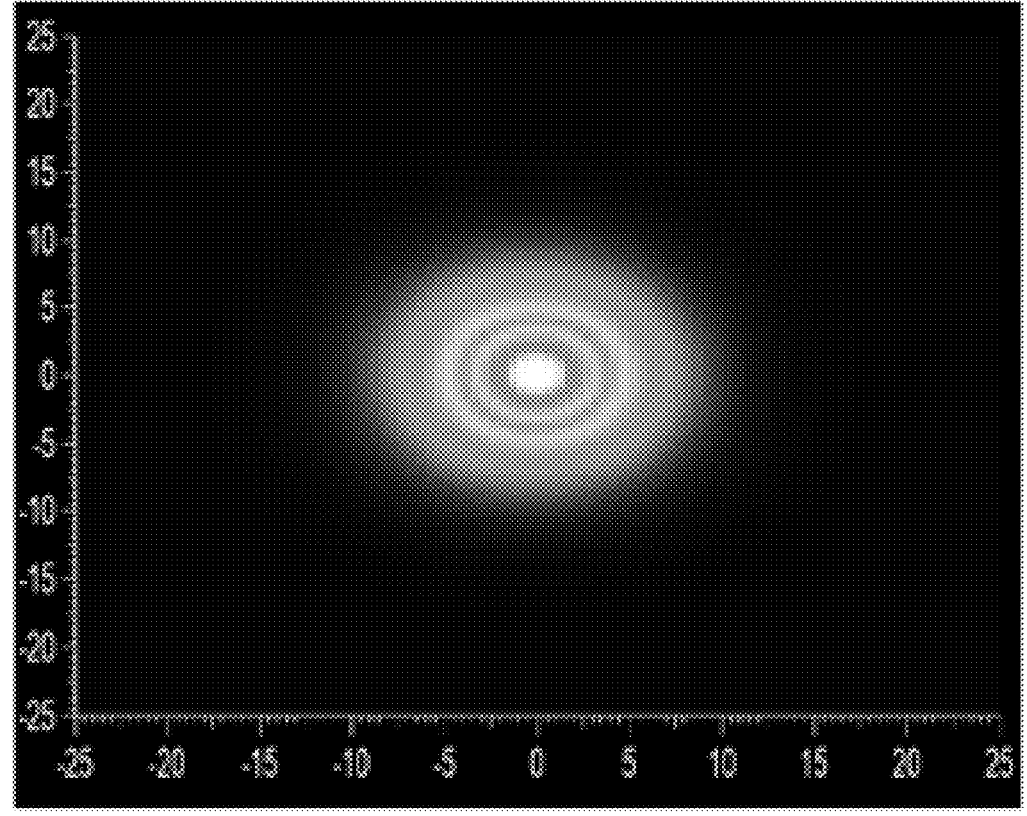
FIG. 1B illustrates a variation of a mode field intensity value of an optical fiber of the prior art.

The optical fiber is illustrated in the accompanying drawings, which like reference letters indicate corresponding parts in the various figures. It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE INVENTION

The principles of the present invention and their advantages are best understood by referring to FIG. 1A to FIG. 8.

In the following detailed description, numerous specific details are set forth in order to provide a thorough understanding of the embodiment of the invention as illustrative or exemplary embodiments of the invention, specific embodiments in which the invention may be practiced are described in sufficient detail to enable those skilled in the art to practice the disclosed embodiments. However, it will be obvious to a person skilled in the art that the embodiments of the invention may be practiced with or without these specific details. In other instances, well-known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

The conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The Following Brief Definition of Terms Shall Apply Throughout the Present Invention An optical fiber refers to a medium associated with transmission of information over long distances in the form of light pulses. The optical fiber uses light to transmit voice and data communications over long distances when encapsulated in a jacket/sheath. The optical fiber may be of ITU.T G.657.A2 category. Alternatively, the optical fiber may be of ITU.T G.657.A1 or G.657.B3 or G.652.D or other suitable category or the optical fiber may be a multi-core optical fiber. The ITU.T, stands for International Telecommunication Union-Telecommunication Standardization Sector, is one of the three sectors of the ITU. The ITU is the United Nations specialized agency in the field of telecommunications and is responsible for studying technical, operating and tariff questions and issuing recommendations on them with a view to standardizing telecommunications on a worldwide basis. The optical fiber may be a bend insensitive fiber that has less degradation in optical properties or less increment in optical attenuation during multiple winding/unwinding operations of an optical fiber cable. The optical fiber comprises one or more cores, one or more clads or claddings and/or one or more coating layers, where a core is a light-carrying portion of the optical fiber using total internal reflection in which optical signal is confined and a cladding is a region that prevents loss of signal by preventing any signal leakage from the core. The refractive index of the cladding is lower than the refractive index of core in order to cause reflection within the core so that light waves are transmitted through the optical fiber. The coating protects the optical fiber from moisture and physical damage and also improves the strength in terms of heat and cold resistance.

Term "core" of an optical fiber as used herein is referred to as the inner most cylindrical structure present in the center of the optical fiber, that is configured to guide the light rays inside the optical fiber.

Term "cladding" of an optical fiber as used herein is referred to as one or more layered structure covering the core of an optical fiber from the outside, that is configured to possess a lower refractive index than the refractive index of the core to facilitate total internal reflection of light rays inside the optical fiber. Further, the cladding of the optical fiber may include an inner cladding layer surrounding the outer surface of the core of the optical fiber and an outer cladding layer surrounding the inner cladding from the outside.

Term "Mole percent (mol %)" as used herein refers to a number of moles of a given material (i.e., Ge) in a composite (i.e., $SiO_{2+x}Ge$) to the total number of moles in the composite (Ge+$SiO_2$). The mole percent (mol %) of a component can be obtained by multiplying a mole fraction of the component by numeric value one hundred.

Term "up doped" as used herein refers to adding doping materials to facilitate an increase in a refractive index of a particular layer or a part of the optical fiber. The materials configured to facilitate up doping are known as "up dopants".

"Term "refractive index" as used herein refers to a measure of change of speed of light from one medium to another and is particularly measured in reference to speed of light in vacuum. More specifically, the refractive index is used to measure bending of light from one medium to another medium.

Term "refractive index (RI) profile" as used herein refers to the distribution of refractive indexes in the optical fiber from the core to the outermost cladding layer of the optical fiber. Based on the refractive index profile, the optical fiber may be configured as a step index fiber or a graded index fiber. The refractive index of a core of a step index fiber is constant throughout the optical fiber and is higher than the refractive index of the cladding. Further, the refractive index of the core is gradually varied as a function of the radial distance from the center of the core for a graded index fiber.

Term "down doping" as used herein refers to adding doping materials to facilitate the decrease in the refractive index of a particular layer or part of an optical fiber. The materials configured to facilitate down doping are known as "down dopants".

Term "undoped or unintentionally doped" as used herein refers a region of the optical fiber contains one or more dopants not intentionally added to the region during fabrication, but Term does not exclude low levels of background doping that may be inherently incorporated during the fabrication process because of diffusion. Such background doping levels are very low and have an insignificant effect on the refractive index of an undoped region.

Term "effective area" as used herein refers to a quantitative measure of an area that a waveguide or fiber mode effectively covers in a number of transverse dimensions.

Term "mode field diameter" (MFD) as used herein refers to size of a light-carrying portion of the optical fiber. For single-mode optical fiber, the MFD may include a core of the single-mode optical fiber as well as a small portion of a cladding surrounding the core of the single-mode optical fiber. The selection of desired MFD helps to describe the size of the light-carrying portion of the optical fiber.

Term "chromatic dispersion" as used herein refers to a phenomenon that depicts a phase velocity and a group velocity of light propagating in a transparent medium depend on an optical frequency. The dependency of the phase velocity and the group velocity on the optical frequency results mostly from the interaction of light with electrons of the medium and is related to absorption of light in some spectral regions.

Term "chromatic dispersion slope" as used herein refers to the total dispersion varying along the length of a waveguide or the optical fiber.

Term "macro bend loss" as used herein refers to losses induced in bends around mandrels (or corners in installations), generally more at the cable level or for optical fibers. The macro bend loss occurs when the fiber cable is subjected to a significant amount of bending above a critical value of curvature. The macro bend loss is also called large radius loss.

Term "cut-off wavelength" as used herein refers to a wavelength above which a single-mode fiber supports and propagates only one mode (i.e., LP01) of light. The cabled optical fiber transmits a single mode of optical signal above a predefined cut-off wavelength.

Term "attenuation" as used herein refers to an amount of light lost between an input and an output. Total attenuation is the sum of all losses. Optical losses of fiber are usually expressed in decibels per kilometer (dB/Km). The losses can be scattering related losses, micro bending losses, macro bending losses and the like.

Term "Micro bend loss" as used herein refers to small-scale bends in the optical fiber, often from pressure exerted on the optical fiber itself as well as being pressed by other components of an optical communication system.

Term "Scattering related losses" as used herein refers to losses that are caused by the interaction of light with density fluctuations within a fiber. Density changes are produced when optical fibers are manufactured. During manufacturing, the regions of higher and lower molecular density areas, relative to the average density of the fiber are created. Light traveling through the fiber interacts with the density areas, the light is then partially scattered in all directions.

Figure 2:
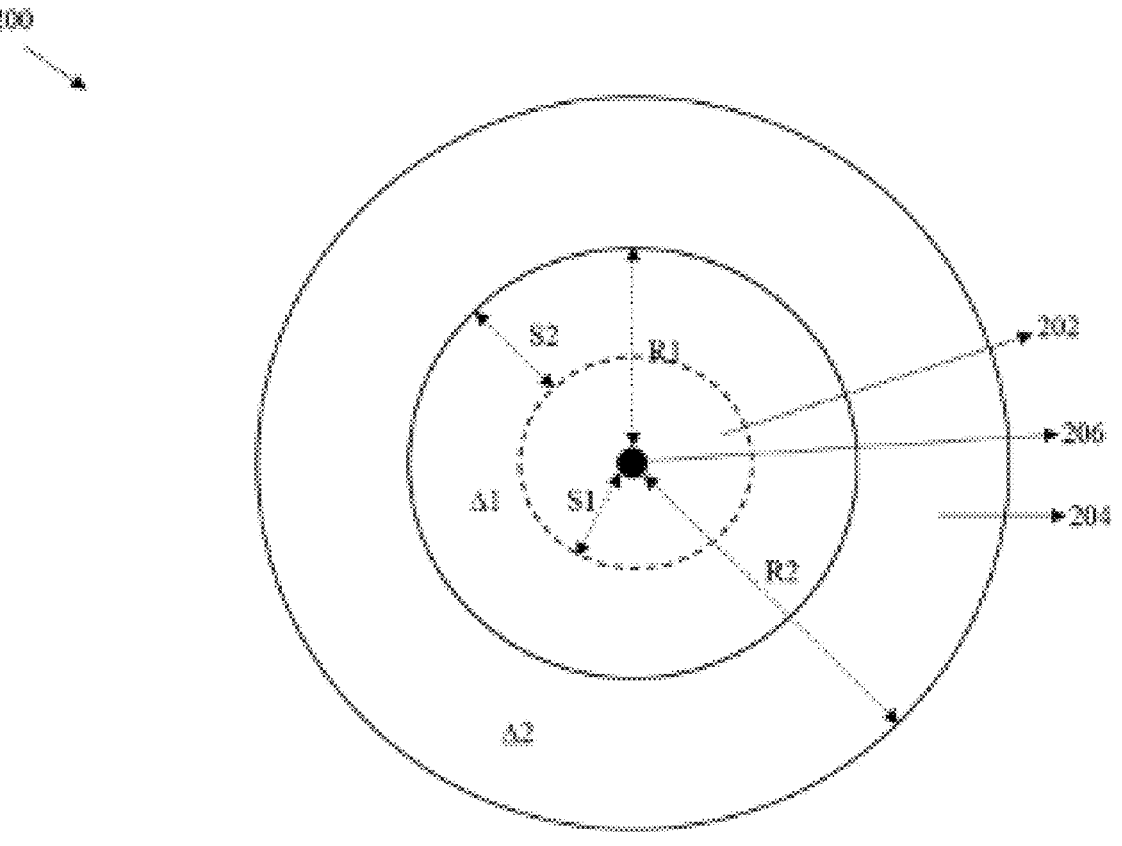
FIG. 2 illustrates a cross-sectional view of an optical fiber in accordance with an embodiment of the present invention.

FIG. 2 illustrates a cross-sectional view of an optical fiber in accordance with an embodiment of the present invention. The optical fiber 200 comprises a core 202 extending substantially parallel and along a central axis 206 concentrically surrounding the core 202. The optical fiber 200 has an effective area of greater than or equal to 100 micrometer square ($\mu m^2$). Alternatively, the effective area of the optical fiber 200 may be in a range of 100-176 $\mu m^2$. Further, the effective area of the optical fiber 200 may specifically be 110 $\mu m^2$.

In accordance with an embodiment of the present invention, the optical fiber 200 may have a mode field diameter (MFD) in a range of 11 μm to 15 μm. Preferably, the MFD of the optical fiber 200 may be 12.15 μm.

In accordance with an embodiment of the present invention, the optical fiber 200 have a chromatic dispersion of less than or equal to 23.5 picoseconds per nano meter wavelength change and kilometer propagation distance (ps/(Km·nm) at a wavelength of 1550 nanometers (nm). In alternate aspects of the present invention, the chromatic dispersion of the optical fiber 200 may specifically be 17.73 ps/(Km·nm) at the wavelength of 1550 nm. Furthermore, the optical fiber 200 may have a chromatic dispersion slope of less than or equal to 0.07 ps/(Km·nm²). Particularly, the chromatic dispersion slope of the optical fiber 200 may be 0.065 ps/(Km·nm²).

In accordance with an embodiment of the present invention, the optical fiber 200 has a macro bend loss of less than or equal to 10 dB/Km at a bend radius 30 mm and wavelength of 1550 nm. The macro bend loss for the optical fiber 200 may be 4.17 dB/Km at the bend radius 30 mm and the wavelength of 1550 nm. Specifically, low macro bend loss (i.e., 4.17 dB per Km at 30 mm bend radius) may provide high confinement of mode filed in the core 202.

In accordance with an embodiment of the present invention, the optical fiber 200 have a cutoff wavelength of less than or equal to 1530 nm. Alternatively, the cutoff wavelength of the optical fiber 200 may specifically be 1516 nm.

In accordance with an embodiment of the present invention, the core 202 have at least 83 mole percent (mol %) of Silicon dioxide (SiO₂) and at most 17 mol % of at least one up dopant. The at least one up dopant of the core 202 may be Germanium (Ge) such that the core 202 may have at least 83 mol % of SiO₂ and at most 17 mol % of Ge. Alternatively, at least one up dopant may be in the form of Germanium Dioxide (GeO₂).

In an aspect of the present invention, the concentration of GeO₂ may be expressed in terms of the refractive index as $$C = 529.329\left[1 - \frac{(Nsi)^2}{(N1)^2}\right]$$

where,
C is the GeO₂ concentration in mol %,
Nsi is refractive index of cladding 204 (pure silica),
N1 (i.e., refractive index of the core 202)

In accordance with an embodiment of the present invention, the optical fiber 200 having SiO₂ up doped with GeO₂ result in a higher refractive index difference in the core 202 of the optical fiber 200. Particularly, GeO₂ is a glass network former material and thus forms natural glass and having GeO₂ as up dopant may result in increased effective area.

In accordance with an embodiment of the present invention, a low effective area of the optical fiber 200 increase nonlinear effects (that may generate spurious signals and increase noise) in the optical fiber 200. Thus, the high effective area may result in low noise in a signal and minimum spurious signal. Aspects of the present invention are intended to include and/or otherwise cover any type of the up dopant for the core 202, including known, related, and later developed materials (similar to Ge and GeO₂) that may facilitate to achieve high effective area of the optical fiber 200, and thus must not be considered as a limitation to the present invention.

In accordance with an embodiment of the present invention, the core 202 may have a core radius R1 in a range of 4.45 μm to 15 μm. Preferably, the core radius R1 may be 4.5 μm. The core 202 have a first refractive index N1 and a first relative refractive index Δ1.

In some aspects of the present invention, the first refractive index N1 may have a maximum value $N1_{max}$ (i.e., a peak refractive index of the core 202) that may be in a range of 1.447 to 1.47. Preferably, the maximum value of the first refractive index $N1_{max}$ may be 1.4495.

Figure 3:
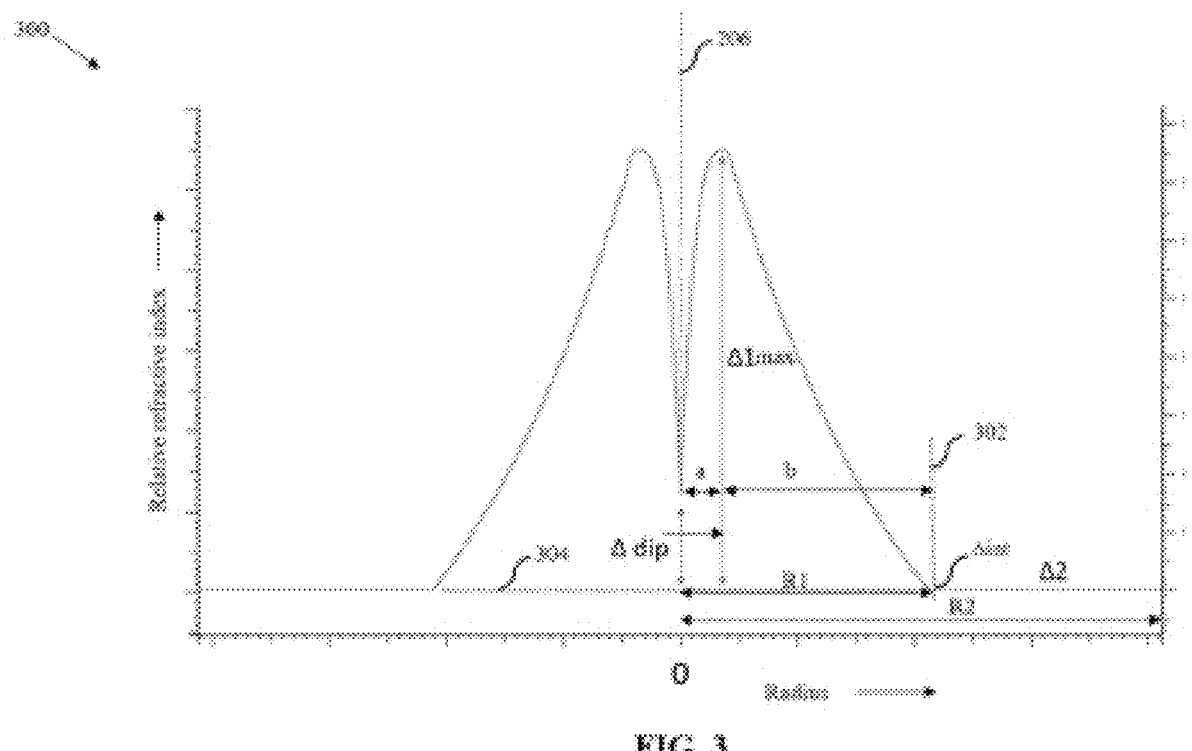
FIG. 3 illustrates a graph that represents a refractive index (RI) profile of the optical fiber in accordance with an embodiment of the present invention.

In some aspects of the present invention, the first relative refractive index Δ1 may have a maximum value $\Delta1_{max}$ (i.e., a peak relative refractive index of the core 202) (as shown in FIG. 3) that may be in a range of 2.05×10⁻³ to 17.5×10⁻³. Preferably, the maximum value of the first relative refractive index $\Delta1_{max}$ may be 3.77×10⁻³.

In an aspect of the present invention, a region of the core 202 having the maximum relative refractive index $\Delta1_{max}$ may have a doping concentration of the up dopant in a range of 2-17 mol %. Preferably, the doping concentration in the region of the core 202 having the maximum relative refractive index $\Delta1_{max}$ may be 3.7 mol %.

In accordance with an embodiment of the present invention, the core radius R1 is segmented into a first segment S1 and a second segment S2. The core 202 may have an exponentially increasing refractive index in the first segment S1 and an exponentially decaying refractive index in the second segment S2.

In accordance with an embodiment of the present invention, cladding 204 may concentrically surround the core 202 such that the cladding 204 has at least 99 mol % of Silicon dioxide (SiO₂) and less than 1 mol % of metallic impurity.

In some aspects of the present invention, the cladding 204 may be undoped and/or unintentionally doped and may be made up of 100% pure silica. In particular, the cladding 204 may have a cladding radius R2, a second refractive index N2 and a second relative refractive index Δ2. The second refractive index N2 may be in a range of 1.444 and 1.44404. Preferably, the second refractive index N2 may be 1.44402.

In some aspects of the present invention, the second relative refractive index Δ2 may be in a range of 0 to 1.3×10⁵. Preferably, the second relative refractive index Δ2 may be 0. The relative refractive index Δi of an ith region such as i=1 for core 202 and i=2 for cladding 204 of the optical fiber 200 may be determined as:

$$\Delta i(\%) = \left(\frac{(Ni)^2 - (Nsi)^2}{2 \cdot (Nsi)^2} \cdot 100\right)$$

where
Ni is refractive index of ith region, and
Nsi is refractive index of pure silica.

FIG. 3 illustrates a graph 300 that represents a refractive index (RI) profile of the optical fiber 200. The graph 300 is a radius versus relative refractive index graph such that an x-axis of the graph 300 represents a radial distance from the central axis 206 and a y-axis of the graph 300 represents a variation in the relative refractive indexes of the optical fiber 200. The graph 300 includes a reference line 304 that is pure silica, and a refractive index of the pure silica may be 1.44402. The optical fiber 200 may have the core 202 segmented into the first segment S1 and the second segment S2. The first segment S1 may extend from the central axis 206 to a first radial distance 'a'. The core 202 adjacent to the central axis 206 may have the first refractive index value of N(0) and a relative refractive index (Δdip) at the central axis 206.

In accordance with an embodiment of the present invention, the core 202 may have a centerline dip adjacent to the central axis 206. The refractive index value at the centerline dip may be in a range of 1.44402 to 1.449. The normalized refractive index difference (Δdip) may be dependent on the refractive index value N(0) adjacent to the central axis 206 and the maximum value of the first refractive index $N1_{max}$. In an exemplary aspect of the present invention, the value of Δdip may be determined as:

$$\Delta dip = \frac{(N1max)^2 - (N(0))^2}{2(N1max)^2}.$$

In accordance with an embodiment of the present invention, the first segment S1 further has the exponentially increasing refractive index from the central axis 206 to the first radial distance 'a'. The refractive index in the first segment S1 may be dependent on the maximum value of refractive index $N1_{max}$, the normalized refractive index difference (Δdip) at the central axis 206, a radial distance 'x1', the first radial distance 'a' and a slope variation 'α'(alpha). In an exemplary aspect of the present invention the refractive index at a point 'x1' in the first segment S1 of the core 202 can be determined as:

$$N(x1) = N1max \sqrt{1 - 2\Delta dip\left(1 - \frac{x1}{a}\right)^{\alpha}}$$

In some aspects of the present invention, 'α'(alpha) may be defined as a variation of slope in the refractive index (RI) profile of the core 202 from the central axis 206 to the first radial distance 'a'(i.e., x1=0 to x1=a). The value of the slope variation 'α'(alpha) may be in a range of 0.1 to 20. Particularly, the value of the slope variation 'α'(alpha) may be 3.5.

In accordance with an embodiment of the present invention, the first segment S1 may have a normalized refractive index difference in a range of 0.0006 to 0.018. Particularly, the relative refractive index in the first segment S1 may be 0.00427.

Further, the second segment S2 may extend from the first radial distance 'a' to a second radial distance 'a+b' from the central axis 206. The second segment S2 may have the exponentially decaying refractive index from the first radial distance 'a' to the second radial distance 'a+b'.

In an exemplary aspect of the present invention, the refractive index 'N(x2)' at any point 'x2' in the second segment S2 of the core 202 (i.e., the exponentially decaying refractive index between the first radial distance 'a' and the second radial distance 'a+b') can be determined as:

$$N(x2) = [N(a) - N(w)]\left(\frac{e}{e-1}\right)\exp\left(\frac{-(x2-a)}{w}\right) + \frac{eN(w) - N(a)}{e-1}.$$

where

'a' is the first radial distance,

N(a) is refractive index of the core at the first radial distance 'a' that is equal to the maximum refractive index $N1_{max}$ of the core 202, 'e' is an exponential constant equal to a value 2.71828, and 'w' is a radial distance from the central axis 206 where the refractive index is N(w).

In accordance with an embodiment of the present invention, the optical fiber 200 may have a smooth core-cladding interface 302 at the second radial distance 'a+b' from the central axis 206. The refractive index at the core-cladding interface 302 may be in a range of 1.444 to 1.44404 at a wavelength of 1550 nm. Preferably, the refractive index at the core-cladding interface 302 may be 1.44402. The cladding 204 may have a constant relative refractive index value Δ2 from the second radial distance 'a+b' to the cladding radius R2 of the cladding 204. In some aspects of the present invention, the second radial distance 'a+b' may be equal to the core radius R1 of the core 202. The relative refractive index Δ2 of the cladding 204 may be in a range of 0 to $1.3 \times 10^{-5}$ at a wavelength of 1550 nm. Preferably, the relative refractive index Δ2 of the cladding 204 may be 0. The RI profile of the optical fiber 200 is illustrated by way of a first half portion of the RI profile of the optical fiber 200, however, it will be apparent to a person skilled in the art that the other half of the RI profile of the optical fiber 200 also possesses same structural and functional characteristics, and thus must not be considered as a limitation of the present invention.

Figure 4:
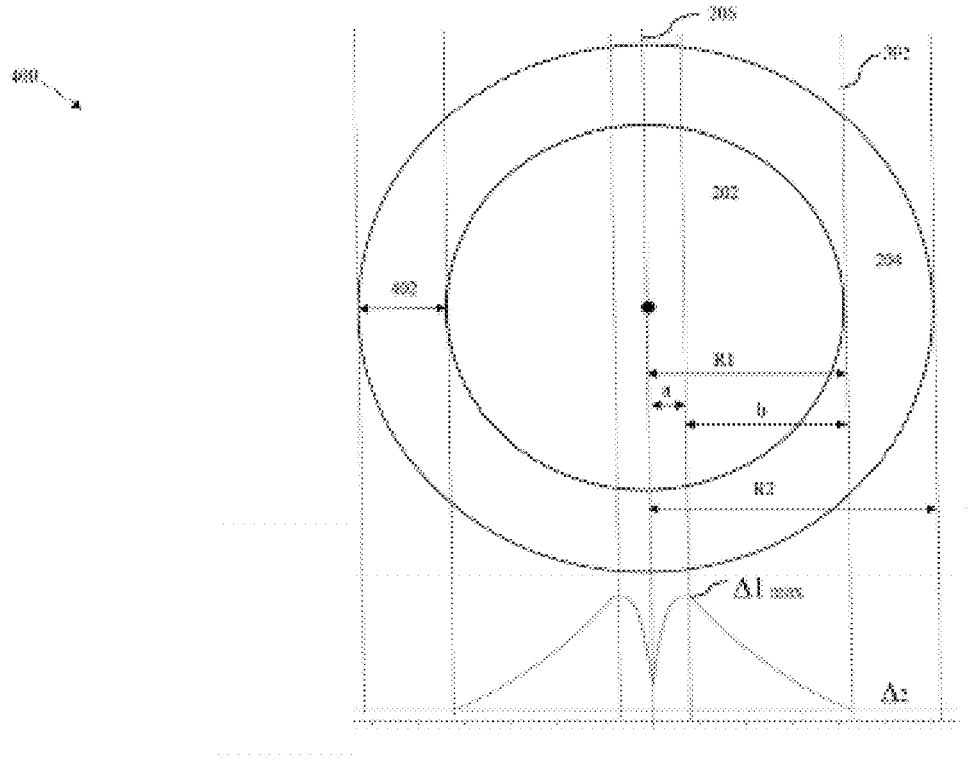
FIG. 4 illustrates a graphical relation of the RI profile with different regions of the optical fiber in accordance with an embodiment of the present invention.

FIG. 4 illustrates a graphical relation 400 of the RI profile with different regions of the optical fiber 200 in accordance with an embodiment of the present invention. The graph 400 is a radial distance versus refractive index graph of the optical fiber 200. The x-axis of the graph 400 represents values of the radial distance from the central axis 206, and the y-axis represents the value of the refractive index of the optical fiber 200.

In some aspects of the present invention, the first relative refractive index Δ1 may have the maximum value $\Delta1_{max}$ (i.e., a peak refractive index of core 202) in the range of $2.05 \times 10^{-3}$ to $17.5 \times 10^{-3}$. The maximum value of the first relative refractive index $\Delta1_{max}$ may be $3.77 \times 10^{-3}$. Further, the region of the core 202 having the maximum relative refractive index $\Delta1_{max}$ may have a doping concentration in a range of 2-17 mol %. Preferably, the doping concentration in the region of the core 202 having the maximum relative refractive index $\Delta1_{max}$ may be 3.7 mol %.

In accordance with an embodiment of the present invention, the core 202 may have the centerline dip at the central axis 206. The first refractive index at the centerline dip (i.e., at the central axis 206) may have a refractive index value of N(0) that may be in a range of 1.44402 to 1.449. The first segment S1 may extend from the central axis 206 to a first radial distance 'a' from the central axis 206 and a thickness value in a range of 0.05 to 1 micrometer (μm). Preferably, the thickness value of the first segment S1 (i.e., 'a') may be 0.69 μm.

In some aspects of the present invention, the first segment S1 may have the exponentially increasing refractive index from the central axis 206 to the first radial distance 'a'.

In accordance with an embodiment of the present invention, the second segment S2 extend from the first radial distance 'a' to the second radial distance 'b'. The second segment S2 may have a thickness value 'b' in a range of 4.4 to 14 μm. Preferably, the thickness value 'b' of the second segment S2 may be 8.625 μm.

In accordance with an embodiment of the present invention, radius R1 of the core 202 may be in the range of 4.45 to 15 μm. A ratio of the thickness of the second segment S2 (i.e., 'b') to the thickness of the first segment S1 (i.e., 'a')

may be in the range of 4.4 to 280. Preferably, the ratio of 'b/a' may be 12.5. High ratio of b/a may help in exponential decrease in the refractive index over a long radial distance, which may make a manufacturing process of the optical fiber 200 easy. The refractive index in the second segment S2 of the core 202 may be exponentially decaying.

In accordance with an embodiment of the present invention, the core-cladding interface 302 may lie at the end of the second segment S2 of the core 202 and have a refractive index 'Nint'value in a range of 1.444 and 1.44404 and a relative refractive index $\Delta$int in range of 0 to $1.3 \times 10^{-5}$. Preferably, the refractive index value 'Nint' for the core-cladding interface 302 may be 1.44402 and the relative refractive index $\Delta$int may be 0.

In accordance with an embodiment of the present invention, the cladding 204 have a thickness 402 (i.e., R2-R1) in a range of 47.5 to 58.05 µm. The cladding 204 may further have a cladding radius R2 in the range of 51.95 to 63.05 µm. Furthermore, the cladding 204 may have the second relative refractive index $\Delta$2 between the core radius R1 and the cladding radius R2 that may lie between 0 to $1.3 \times 10^5$. Preferably, the second relative refractive index may be 0.

Figure 5:
FIG. 5 illustrates a graph that represents an effect of a slope variation 'a'(alpha) in a first segment of a core of the optical fiber on a mode field diameter (MFD) and an effective area of the optical fiber in accordance with an embodiment of the present invention.
Figure 5:
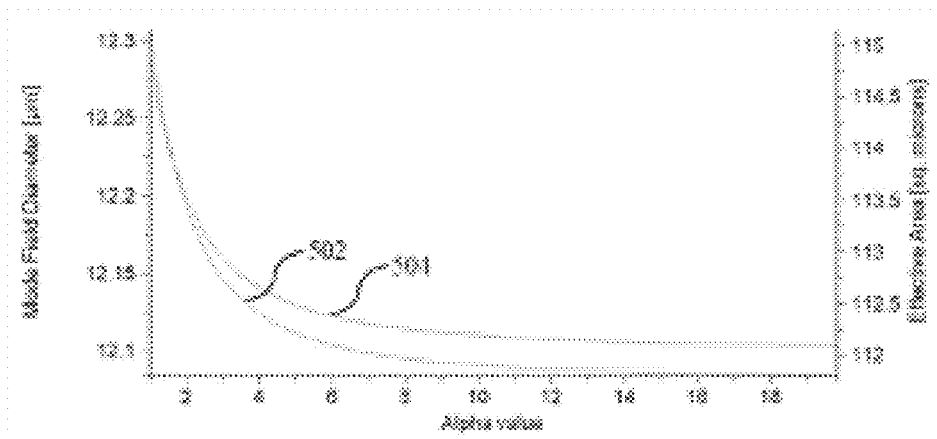

FIG. 5 illustrates a graph 500 that represents an effect of the slope variation 'a' (alpha) in the first segment S1 of the core 202 of the optical fiber 200 on a mode field diameter (MFD) and an effective area of the optical fiber 200. The graph 500 is an 'α'(alpha) value versus MFD, and 'α' (alpha) value versus the effective area graph. The x-axis of the graph 500 represents values of the variation of slope 'α'(alpha), and a first y-axis represents the value of MFD of the optical fiber 200, whereas a second y-axis represents the value of the effective area of the optical fiber 200.

In accordance with an embodiment of the present invention, variation in the value of the MFD with respect to change in the variation of slope 'α' is represented as And a variation in the value of the effective area with respect to change in the variation of slope 'α'(alpha) is represented as 504. In some aspects of the present invention, increasing the variation of slope 'α' decreases the MFD and the effective area of the optical fiber 200.

Figure 6:
FIG. 6 illustrates a graph that represents an effect of a slope variation 'a'(alpha) in the first segment of the optical fiber on a value of a chromatic dispersion at a wavelength of 1550 nm in accordance with an embodiment of the present invention.
Figure 6:
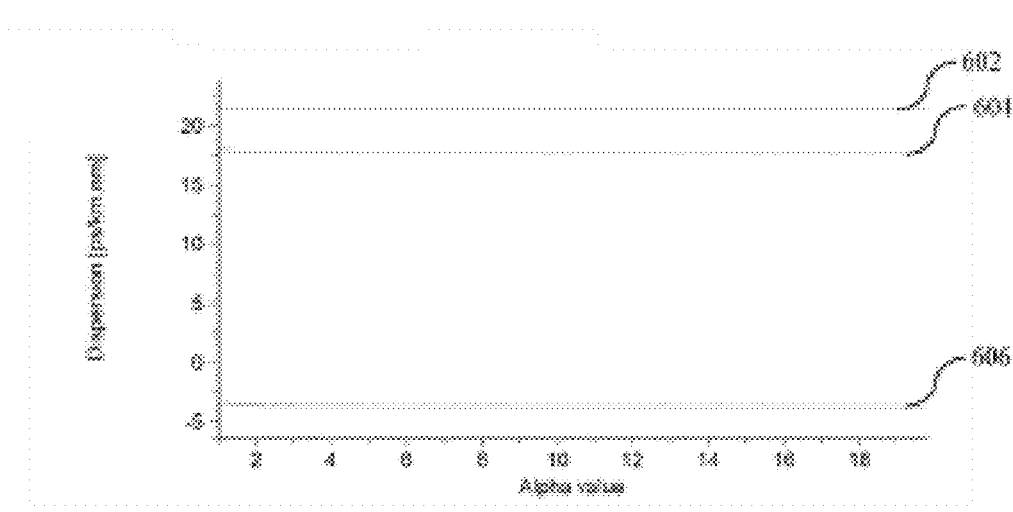

FIG. 6 illustrates a graph 600 that represents an effect of a slope variation 'a' (alpha) in the first segment of the optical fiber 200 on a value of the chromatic dispersion at the wavelength of 1550 nm. The graph 600 is an 'α'(alpha) value versus dispersion value graph such that the x-axis of the graph 600 represents values of the variation of slope 'α'(alpha), and the y-axis represents the value of dispersion at 1550 nm wavelength.

In some aspects of the present invention, the variation of a material dispersion with respect to change in the 'α'(alpha) value is represented as 602. The variation of a total dispersion with respect to change in the 'α'(alpha) value is represented as 604. In accordance with an embodiment of the present invention, the variation of a waveguide dispersion with respect to change in the 'α'(alpha) value is represented as 606.

In some aspects of the present invention, increasing the value of the variation of slope 'α'(alpha) may decrease the dispersion at the wavelength of 1550 nm.

In some aspects of the present invention, the value of 'α'(alpha) is in a range of 0.1 to 20. In some aspects of the present invention, the value of 'α'(alpha) equals to zero may represent a condition where dip may have a vertical fall from $\Delta'1_{max}'$ to $\Delta'(0)'$ at the central axis 206.

Figure 7:
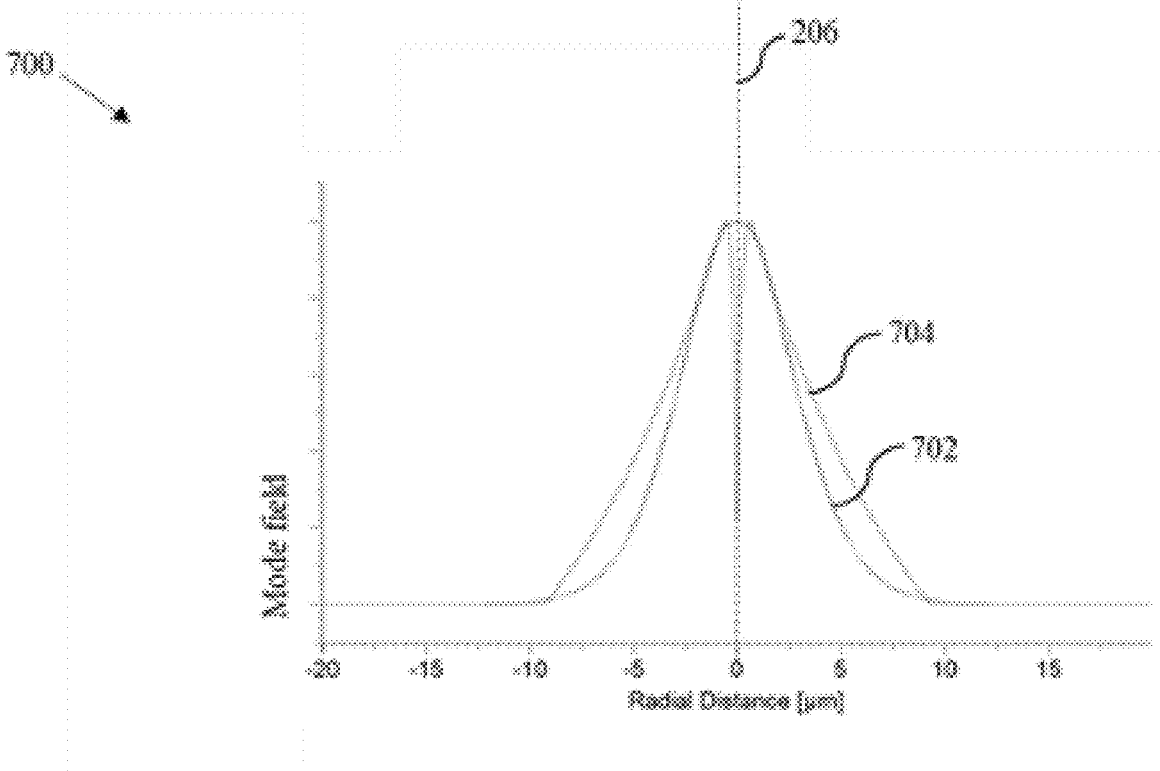
FIG. 7 illustrates a graph that represents a confinement value versus a mode field value of the core of the optical fiber for a fundamental mode (LP01) at a wavelength of 1550 nm in accordance with an embodiment of the present invention.

FIG. 7 illustrates a graph 700 that illustrates a confinement value versus the mode field value of the core 202 of the optical fiber 200 for the fundamental mode (LP01) at the wavelength of 1550 nm. The graph 700 is radial distance from the central axis 206 versus MFD graph such that the x-axis of the graph 700 represents values of radial distance from the central axis 206, and the y-axis represents the value of MFD of the core 202 of the optical fiber 200 for the fundamental mode (LP01) at the wavelength of 1550 nm.

In accordance with an embodiment of the present invention, the MFD of the optical fiber 200 for the fundamental mode (LP01) at the wavelength of 1550 nm is shown as 702. A confinement region for the optical fiber 200 is shown as 704. The MFD of the optical fiber 200 for the fundamental mode (LP01) at the wavelength of 1550 nm may have higher confinement.

In one aspect of the present invention, high relative refractive index may increase the confinement region of the fundamental mode field in the optical fiber and may increase the optical cutoff wavelength and may reduce the bending loss. In another aspect of the present invention, high relative refractive index may increase a Rayleigh scattering of light in the optical fiber 200, which may result in an increase in the attenuation at the wavelength of 1550 nm.

Figure 8:
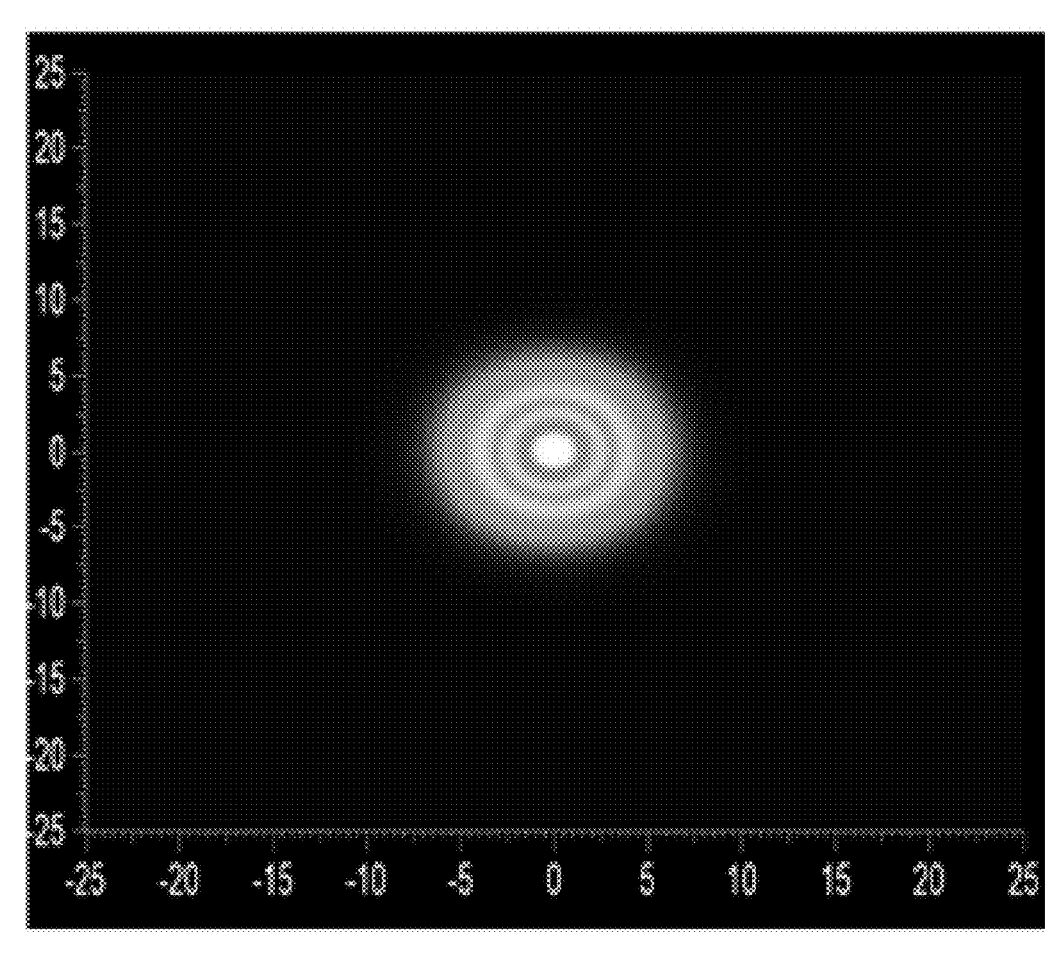
FIG. 8 illustrates a graphical variation of a mode field intensity value of the optical fiber in accordance with an embodiment of the present invention.

FIG. 8 illustrates a graphical variation 800 of a mode field intensity value of the optical fiber 200. The mode field intensity of the optical fiber 200 for the fundamental mode (LP01) at the wavelength of 1550 nm may be highly confined in the second segment S2 (i.e., the exponentially decaying refractive index profile of the core 202) as compared to the variation of the mode field intensity for the fundamental mode (LP01) at the wavelength of 1550 nm.

Advantageously, the optical fiber 200 of the present invention provides a higher confinement of mode field inside the core 202, thereby increasing the effective area and reducing nonlinear effects of the optical fiber 200 (i.e., less spurious signals and low noise). In some aspects of the present invention, the undoped or unintentionally doped cladding 204 results in reduced manufacturing cost of the optical fiber 200 as the cost of fluorination may be reduced for the optical fiber 200.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

In a case that no conflict occurs, the embodiments in the present invention and the features in the embodiments may be mutually combined. The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed for:

1. An optical fiber (200) comprising:

a core (202) having at least 83 mole percent (mol %) of Silicon dioxide (SiO₂), wherein the core (202) has at least one up dopant, wherein the core (202) has a refractive index (RI) profile defined by a centerline dip at a central axis (206);

a cladding (204) that concentrically surrounds the core (102), wherein the cladding (204) has at least 99 mole percent (mol %) of Silicon dioxide (SiO₂);

wherein, the optical fiber (200) has (i) an effective area is greater than or equal to 100 micrometers square (μm²), (ii) a mode field diameter (MFD) in a range of 11 micrometer (μm) to 15 μm.

2. The optical fiber (200) as claimed in claim 1, wherein the optical fiber (200) has a chromatic dispersion of less than or equal to 23.5 Picoseconds per nanometer wavelength change and kilometer propagation distance (ps/km)*nm at a wavelength of 1550 nm.

3. The optical fiber (200) as claimed in claim 1, wherein the at least one up dopant is Germanium (Ge).

4. The optical fiber (200) as claimed in claim 1, wherein the core (202) and the cladding (204) interfaces at a core-cladding interface (302).

5. The optical fiber (200) as claimed in claim 1, wherein a concentration of the up dopant at the core-cladding interface (302) is less than 17 mol %.

6. The optical fiber (200) as claimed in claim 1, wherein the cladding (204) is made up of pure silica with less than 1% metallic impurity.

7. The optical fiber (200) as claimed in claim 1, wherein the core (202) has a core radius (R1) in a range of 4.45 μm to 15 μm.

8. The optical fiber (200) as claimed in claim 1, wherein the cladding (204) has a cladding thickness (402) in a range of 47.5 μm to 58.05 μm.

9. The optical fiber (200) as claimed in claim 1, wherein the core (202) has a maximum relative refractive index (Δ1 max) in a range of $2.05 \times 10^{-3}$ to $17.5 \times 10^{-3}$.

10. The optical fiber (200) as claimed in claim 1, wherein the cladding (204) has a relative refractive index (Δ2) in a range of 0 to $1.3 \times 10^{-5}$.

11. The optical fiber (200) as claimed in claim 1, wherein the core-cladding interface (302) has a relative refractive index (Δint) in a range of 0 to $1.3 \times 10^{-5}$.

12. The optical fiber (200) as claimed in claim 1, wherein a chromatic dispersion value of the optical fiber (200) is 20.87 ps/Km·nm at a wavelength of 1600 nano meter (nm).

13. The optical fiber (200) as claimed in claim 1, wherein the chromatic dispersion value is 14.39 ps/Km·nm at a wavelength of 1500 nm.

14. The optical fiber (200) as claimed in claim 1, wherein a cutoff wavelength of the optical fiber (200) is less than or equal to 1530 nm.

15. The optical fiber (200) as claimed in claim 1, wherein a macro bend loss of the optical fiber (200) is less than or equal to 10 dB/KM at a bend radius 30 mm and a wavelength of 1550 nm.

16. The optical fiber (200) as claimed in claim 1, wherein the core (202) extends substantially parallel and along a central axis (206) of the optical fiber (200).

17. The optical fiber (200) as claimed in claim 1, wherein a refractive index at the centerline dip is in a range of 1.44402 to 1.449.

18. The optical fiber (200) as claimed in claim 1, wherein the refractive index (RI) profile of the core (202) is an exponential decay refractive index profile which is determined by an equation:

$$N(x2) = [N(a) - N(w)]\left(\frac{e}{e-1}\right)\exp\left(\frac{-(x2-a)}{w}\right) + \frac{eN(w)-N(a)}{e-1}.$$

where x2 is a radial distance from the center axis (206) between a first radial distance 'a' and a second radial distance 'a+b' of the core (202);

N(a) is refractive index of the core at the first radial distance 'a' equal to the maximum refractive index $N1_{max}$ of the core 202;

'e' are exponential constant equal to a value 2.71828; and

'w' is a radial distance from the central axis 206 where the refractive index is N(w).

* * * * *